(12) United States Patent
Chen

(10) Patent No.: US 8,275,915 B2
(45) Date of Patent: *Sep. 25, 2012

(54) LINK STATE DETECTION SYSTEM FOR NETWORK CABLE

(75) Inventor: Te-Lung Chen, Keelung (TW)

(73) Assignee: Getac Technology Corporation, Hsinchu (TW)

( * ) Notice: Subject to any disclaimer, the term of this patent is extended or adjusted under 35 U.S.C. 154(b) by 3 days.

This patent is subject to a terminal disclaimer.

(21) Appl. No.: 12/730,165

(22) Filed: Mar. 23, 2010

(65) Prior Publication Data

US 2010/0180133 A1    Jul. 15, 2010

Related U.S. Application Data

(62) Division of application No. 12/022,082, filed on Jan. 29, 2008.

(51) Int. Cl.
G06F 3/00 (2006.01)
G06F 1/00 (2006.01)

(52) U.S. Cl. .............. 710/16; 710/19; 713/324

(58) Field of Classification Search .............. 713/310, 713/320, 324; 710/16, 17, 19
See application file for complete search history.

(56) References Cited

U.S. PATENT DOCUMENTS

| | | | |
|---|---|---|---|
| 6,393,570 B1 | 5/2002 | Henderson et al. | |
| 6,477,605 B1 | 11/2002 | Taki et al. | |
| 6,694,440 B1 * | 2/2004 | Ishibashi | 713/310 |
| 6,772,353 B2 * | 8/2004 | Konaka et al. | 713/300 |
| 6,856,138 B2 * | 2/2005 | Bohley | 324/534 |
| 7,243,249 B1 * | 7/2007 | Dunstan et al. | 713/310 |
| 7,454,641 B2 * | 11/2008 | Connor et al. | 713/324 |
| 2001/0021981 A1 * | 9/2001 | Konaka et al. | 713/300 |
| 2004/0251913 A1 * | 12/2004 | Pharn et al. | 324/534 |
| 2005/0144493 A1 | 6/2005 | Cromer et al. | |
| 2006/0129862 A1 | 6/2006 | Liu et al. | |
| 2006/0136168 A1 | 6/2006 | Nakamura et al. | |
| 2006/0152842 A1 | 7/2006 | Pasolini et al. | |
| 2006/0214253 A1 | 9/2006 | Camagna et al. | |
| 2007/0094708 A1 | 4/2007 | Hess | |
| 2007/0168047 A1 | 7/2007 | Cromer et al. | |
| 2007/0293953 A1 * | 12/2007 | Hoshi | 700/12 |

(Continued)

FOREIGN PATENT DOCUMENTS

CN    1797281 A    7/2006

(Continued)

OTHER PUBLICATIONS

Lee, An Efficient Power-Saving Mechanism for Integration of WLAN and Cellular Networks, Nov. 12, 2005, vol. 9, pp. 1-3.*

(Continued)

Primary Examiner — Ernest Unelus

(57) ABSTRACT

A link detection system for a network cable is applicable for detecting a connection state of the network cable. If the network cable is connected to the link detection system, the network state detection unit sends a voltage level of a first signal, so as to turn on the power supply of the LAN controller. If the network cable is unplugged, the LAN controller sends a second signal, so as to turn off the power supply of the LAN controller. Alternatively, if the network cable is linked to the network interface in an idle contact state, the network state detection unit sends another voltage level of the first signal, so as to not turn on the power supply of the LAN controller, thereby reducing the power consumption of the personal computer.

6 Claims, 5 Drawing Sheets

U.S. PATENT DOCUMENTS

| | | | |
|---|---|---|---|
| 2009/0235104 A1* | 9/2009 | Fung | 713/324 |
| 2009/0300392 A1 | 12/2009 | Henderson et al. | |

FOREIGN PATENT DOCUMENTS

| | | | |
|---|---|---|---|
| CN | 1897140 A | 1/2007 |
| CN | 1937058 A | 3/2007 |
| CN | 1941132 A | 4/2007 |
| JP | 2002-016612 | 1/2002 |
| TW | 364690 | 7/1999 |
| TW | 400468 | 8/2000 |
| TW | 547709 | 8/2003 |
| TW | 200619917 | 6/2006 |
| TW | I258655 | 7/2006 |

OTHER PUBLICATIONS

Presentation in the course "Computer Architecture", Topic 19 by Sebastian Luth and Thiemo Mattig, II99, presented on May 22, 2001.

* cited by examiner

LINK STATE DETECTION SYSTEM FOR NETWORK CABLE

This application is a divisional of U.S. patent application Ser. No. 12/022,082, filed Jan. 29, 2008, the entire disclosure of which is hereby incorporated by reference.

FIELD OF THE INVENTION

The present invention relates to a network state detection system. More particularly, the present invention relates to a system for detecting a connection state between a network cable and a personal computer, so as to control a power supply for a LAN controller.

RELATED ART

As the environmental protection awareness and energy saving awareness are gradually enhanced, it has become an important topic about how to make each device in a personal computer be operated in a high efficiency. In the conventional power-saving design of the personal computer, the host software must be interacted with a device controller, so as to achieve a suitable power-saving set through mutual coordination. Recently, a mechanism named active state power management (ASPM) is most commonly used. The ASPM defines five power modes from a normal operation mode to a complete power off mode, including: L0 power mode, L0s power mode, L1 power mode, L2 power mode, and L3 power mode.

The L0 power mode is used to perform the power source control of each device during the normal operation. Under the L1 power mode, each connected device is in the full-line operation state, at this time, the clock of each device is activated, so any transmission operation is performed at a normal delay speed, and thus, it is necessary for all the devices in the personal computer to support this mode. The L0s power mode is used to process the power source control of each device during the stand-by. It is necessary for the personal computer to support the L1 power mode. In the L0s power mode, the clock maintains to be operated, and the power source also maintains the ON state. At this time, the connected device does not actively transfer data. The delay time for the restoring process of the L0s power mode is quite short, so the switching speed is quite high.

The L1 power mode is a power source management mode that functions when all the devices are in an idle state. The power-saving efficiency of the L1 power mode is much better than that of the L0s power mode, but the disadvantage of the L1 power mode is that the delay time is relatively long. During the L2 power mode, only an auxiliary power source is activated. Except for turning off all the power sources on the device, the L1 power mode is the state with the lowest power consumption. In the L2 power mode, the clock signals of all the devices are in the idle state, except for low-frequency clocks used for detecting the network wake function and beacon event. Finally, the L3 power mode is that the power source is turned off, and the power source of each connected device is turned off.

For example, the detection of the network connection state also affects the total power consumption efficiency of the computer. If the network link state always maintains the ON state, and other devices are necessarily maintained in the operation state, the personal computer cannot enter the L1 power source management mode, and the total power consumption is increased. Particularly, if this circumstance happens to a notebook computer, the electric power of the cell is quickly consumed, such that the total using performance of the notebook computer is seriously reduced.

In the conventional art, there are two processes for detecting whether the network operates or not. The first one is that a changeover switch is disposed in the network interface, in which the network interface is a RJ-45 pin. When the network cable is plugged into the network interface, a network connector triggers the changeover switch. If the south bridge controller detects that the changeover switch has been triggered, the power source of the LAN controller is turned on, so as to perform the data transmission.

For example, in Taiwan Patent Publication No. 200619917, entitled "Power-saving Device of Network Controller for Computer", it is disclosed that a ninth pin is further disposed on a network socket. The ninth pin is called the power-saving pin in Taiwan Patent Publication No. 200619917, which is used for detecting the linking state for the network. When the network cable is connected, a low voltage level is formed between the power-saving pin and the LAN controller, and upon detecting the low voltage level, the south bridge controller turns on the power supply of the LAN controller. On the contrary, if the network cable is unplugged, a high voltage level is formed between the power-saving pin and the LAN controller, and the south bridge controller turns off the power supply of the LAN controller. The disadvantage of the above process lies in that, it is impossible for the power-saving pin to determine whether the network cable is in an idle contact sate or not. The so-called "idle contact" is that, although the physical link is established between the network cable and the personal computer, no signals are transferred in the network cable at all, which is similar to the following circumstance that if one end of the network cable is linked to a personal computer, and the other end is not linked to any device, the end with the personal computer does not have any electrical signals being transmitted. If the network cable is in the idle contact state, the LAN controller actually cannot perform any transmission action, and the personal computer incorrectly determines that the LAN controller is still in the operation state, such that the personal computer cannot enter the L1 power mode.

The other process is that a specific south bridge controller or a specific network chip is used to detect whether any network cable is linked or not. Although the process can solve the idle contact state mentioned in the above process, the specific elements such as the south bridge controller and the LAN controller are required to be cooperated with each other so as to achieve the above functions. In this manner, the developing cost of the manufacturer is increased, and during the developing process, the manufacturer cannot adopt south bridge controllers or network chips in other models.

SUMMARY OF THE INVENTION

In view of the above problems, the present invention is mainly directed to a link state detection system for a network cable in a personal computer. The detection system is used to detect whether the personal computer is connected with the network cable or not, thereby determining whether to turn on or off a power source of a LAN controller.

In order to achieve the above objective, the present invention provides a network state detection system, which is used to detect whether it is connected with the network cable or not. The detection system includes a network interface, a network state detection unit, a LAN controller, a main control unit, and a south bridge controller. The network interface is used to link the network cable. The network state detection unit is electrically connected to the network interface. After the network state detection unit has been connected with the network cable, the network state detection unit converts the received potential variation into a pulse signal. Then, it is detected whether the network cable is connected or not, depending upon the fact whether the pulse signal has a variation. If the network cable is linked to the network state detection unit, a first signal is output. The LAN controller is electrically connected to the network interface, and if the network cable is unplugged, the LAN controller outputs a second signal. The main control unit is electrically connected to the network state detection unit and the LAN controller respectively, and receives the first signal and the second signal and outputs a third signal according to voltage levels of the first and second signals. The south bridge controller is electrically connected to the main control unit and the LAN controller respectively, and receives the third signal, and determines whether to turn on or off the power supply of the LAN controller according to the third signal.

The present invention can be further combined with the south bridge controller, such that the personal computer can switch various peripherals to other power source management modes through the south bridge controller. The present invention is also directed to determining whether the network cable is in an idle contact state or not depending upon the fact whether the network state detection unit generates a pulse signal or not when the network is detected to be linked. In the present invention, the network state detection unit and the main control unit are used together to detect the plugging and unplugging state of the network cable, and to determine whether the network cable is in the idle contact state or not when the network cable is linked. According to the above situation, the personal computer determines whether to turn off the power supply of the LAN controller or not, and accordingly, other peripherals of the personal computer enter a power-saving mode.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, which thus is not limitative of the present invention, and wherein.

DETAILED DESCRIPTION

Figure 1A:
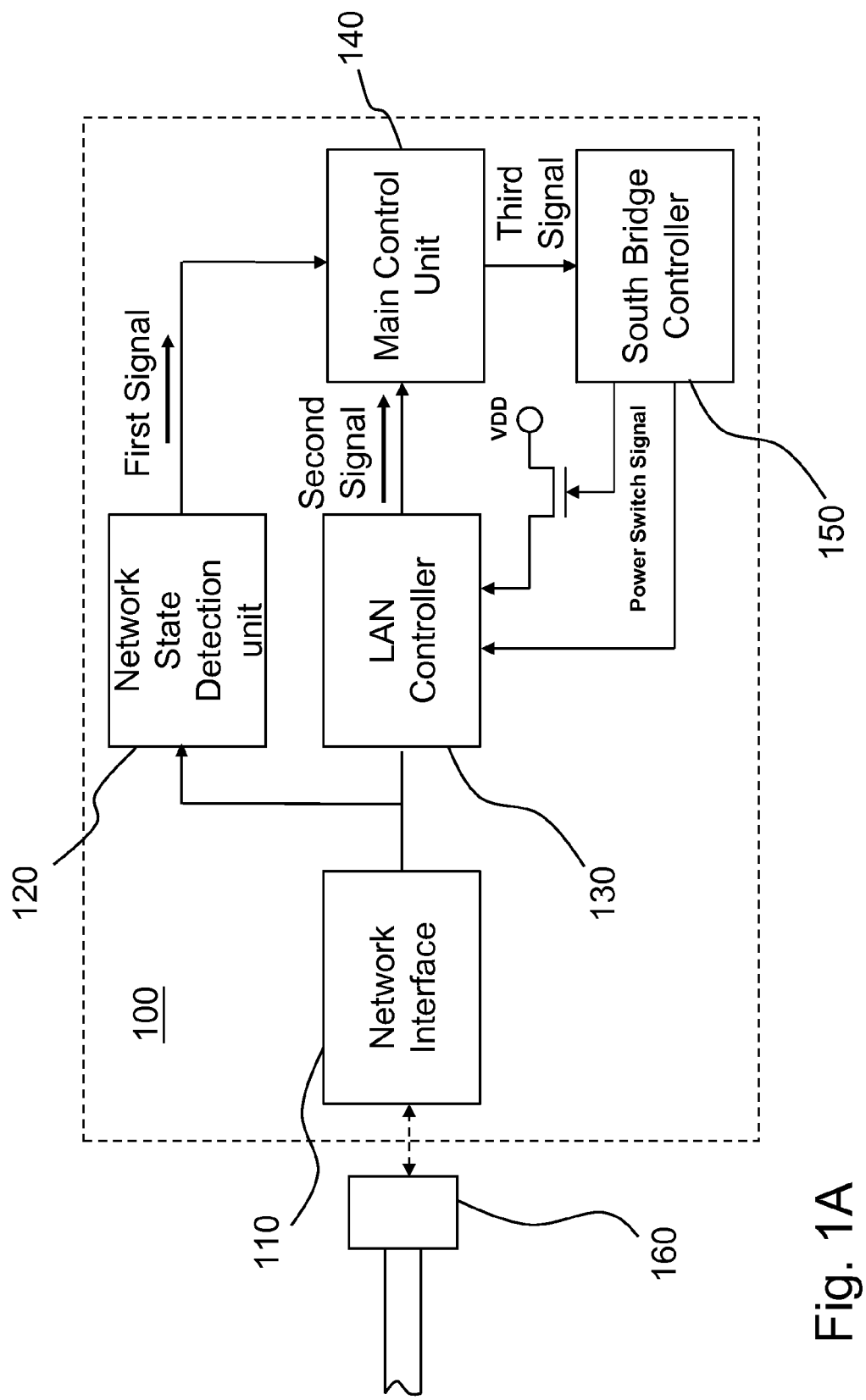
FIG. 1A is a schematic view of an architecture of the present invention.

Referring to FIG. 1A, it is a circuit architecture of the present invention. A link detection system 100 for a network cable includes a network interface 110, a network state detection unit 120, a LAN controller 130, a main control unit 140, and a south bridge controller 150.

The network interface 110 is used to link the network cable 160 and the detection system 100. The network interface 110 can be, but is not limited to, 100 BaseT or 100 BaseX. In the illustration of this embodiment, RJ-45 is taken as an example of the network interface 110.

Figure 1B:
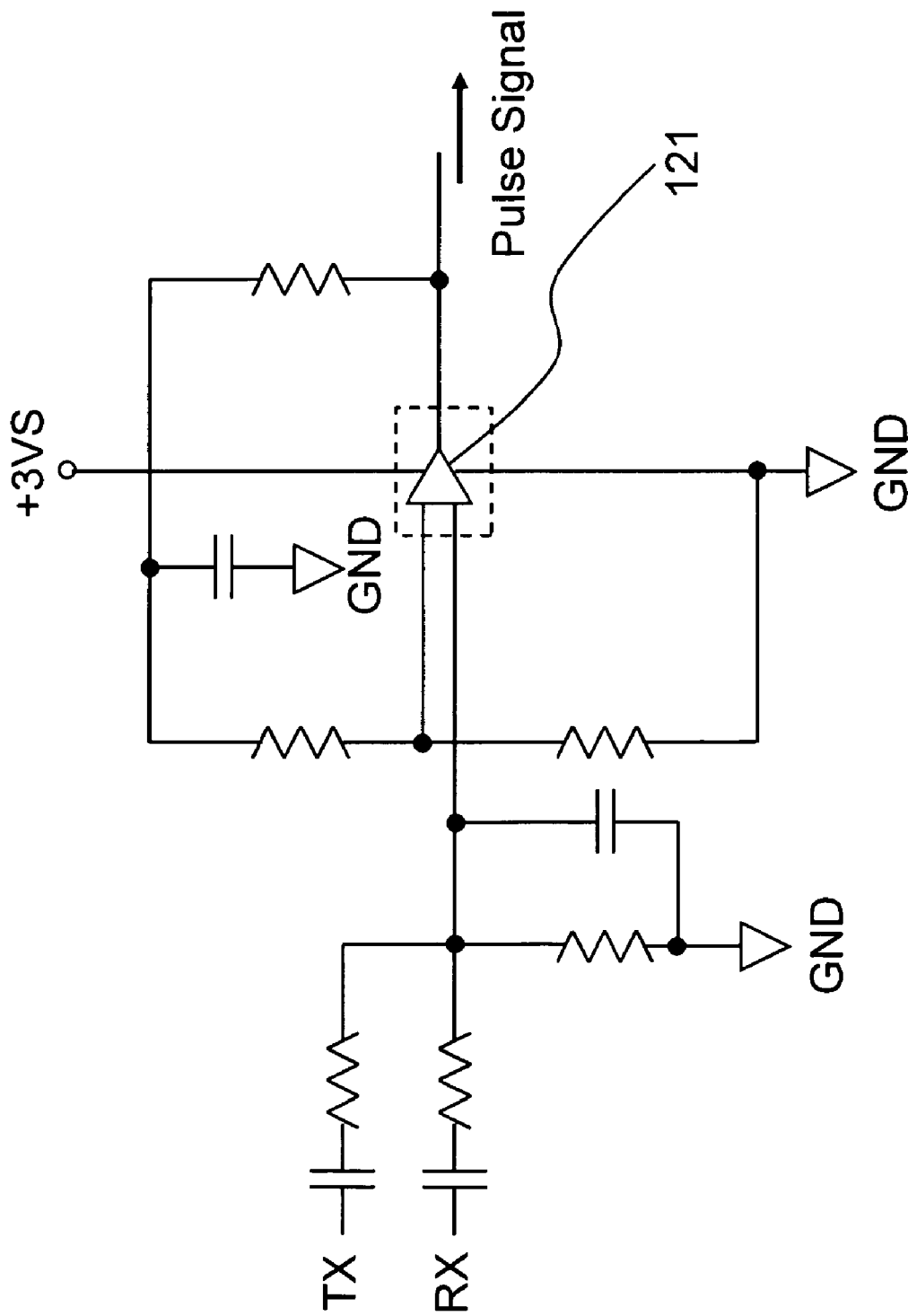
FIG. 1B is a circuit diagram of a network state detection unit according to the present invention.

The network state detection unit 120 is electrically connected to the network interface 110. The network state detection unit 120 detects whether the network cable 160 is connected to the link detection system 100 or not, i.e. whether the network cable 160 interfaces with the network interface 110 or not, according to a pulse signal. The pulse signal is generated by the network state detection unit according to the voltage variation of an electrical signal, such as packets, transmitted by the network cable 160. Referring to FIG. 1B, it is a partial circuit diagram of the network state detection unit. In the left part of FIG. 1B, TX and RX pins in the network cable are shown respectively. In FIG. 1B, a digital comparator 121 can select, but not limited to, LMV331 comparator. It should be particular noted that, after the network cable 160 is linked to the link detection system 100, TX and RX pins transmits/receives different electrical signals respectively, the digital comparator 121 transforms the electrical signal into a regular oscillating pulse signal. If the network cable 160 is unplugged from the detection system 100, the pulse signal becomes a constant voltage level, and in this embodiment, it is, for example, a high voltage level.

When the network cable 160 is linked to the link detection system 100, the network state detection unit 120 outputs a first signal according to the pulse signal. In one connection state, the network state detection unit 120 changes the voltage level of the first signal to set it at a low voltage level, so as to turn on the power supply of the LAN controller 130. In another connection state, referred to as "idle contact state", although the network cable 160 is physically linked to the network interface 110, no electrical signals are transferred between the network cable 160 and the detection system 100. When the network cable 160 is in the idle contact state, the network state detection unit 120 does not generate the pulse signal, and thus, the power supply of the LAN controller 130 does not turned on.

The LAN controller 130 is electrically connected to the network interface 110. When the network cable 160 is unplugged to not interface with the network interface 110, the LAN controller 130 outputs a second signal. When the network cable 160 is unplugged from the detection system 100, the second signal is set at a low voltage level, and the LAN controller 130 sends the low voltage level of the second signal to inform each relevant element to turn off the power supply of the LAN controller 130. The main control unit 140 is electrically connected to the network state detection unit 120 and the LAN controller 130. The main control unit 140 receives the first signal and the second signal and outputs a third signal according to voltage levels of the first and second signals. The third signal is used to control the ON or OFF of the power supply of the LAN controller 130. The south bridge controller 150 is electrically connected to the main control unit 140 and the LAN controller 130. The south bridge controller 150 switches the power source of the LAN controller according to control of the main control unit 130. Herein, the south bridge controller 150 receives the third signal sent by the main control unit 140 and switches the power source of the LAN controller according to the third signal.

Figure 2:
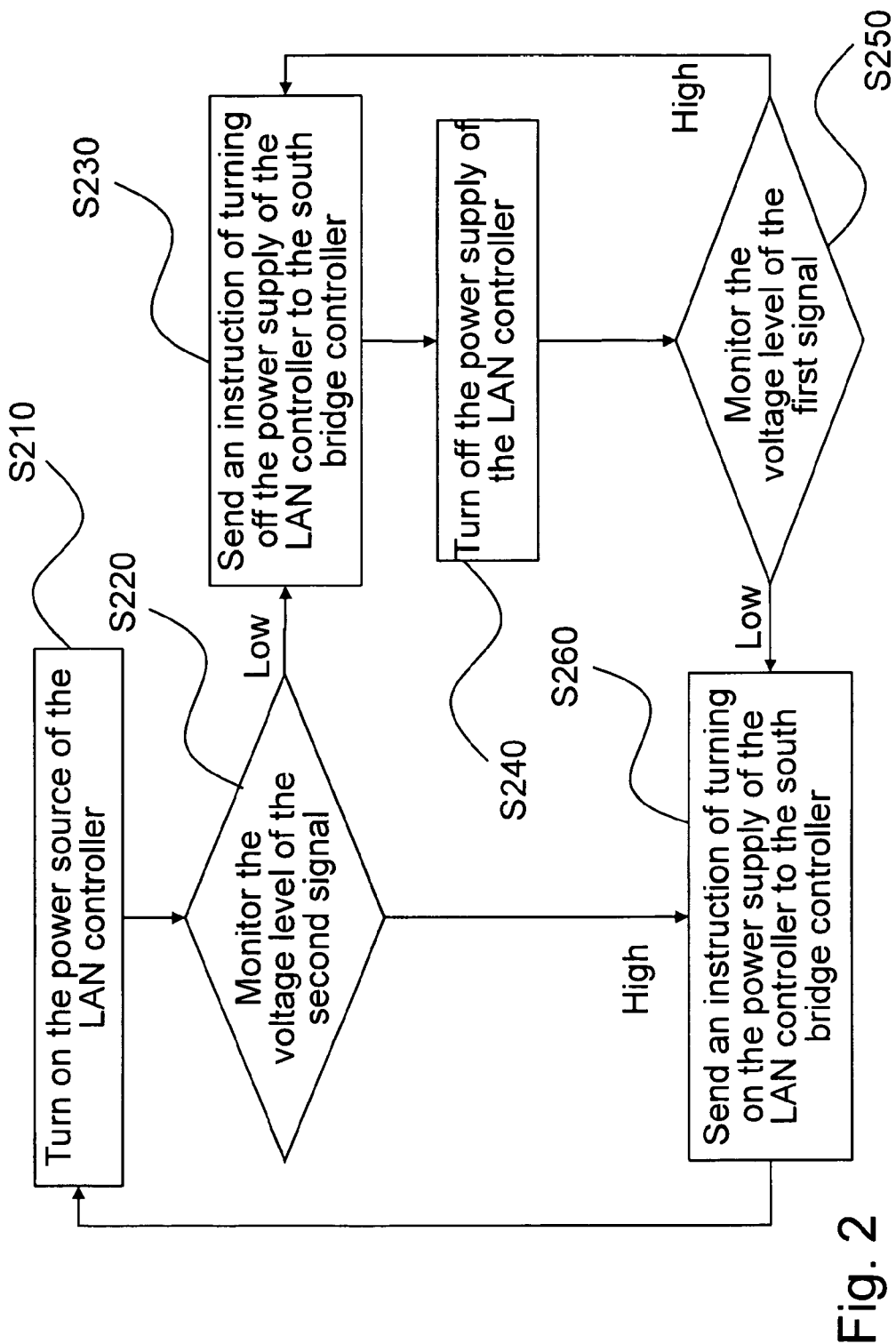
FIG. 2 is a schematic view of an operation flow of the present invention.

Referring to FIG. 2, it is a schematic view of an operation flow of the present invention. Firstly, the personal computer is powered on, and meanwhile, the south bridge controller turns on the power source of the LAN controller (Step S210). Next, the main control unit detects the voltage level of the second signal sent by the LAN controller (Step S220). If the voltage level of the second signal is a low voltage level, the main control unit 140 sends the third signal to the south bridge controller, such that the south bridge controller sends an instruction of turning off the power supply of the LAN controller, such as a power switching signal (Step S230).

The south bridge controller 150 turns off the power supply of the LAN controller (Step S240). Then, the main control unit detects the voltage level of a first signal (Step S250). If the voltage level of the first signal is a high voltage level, the main control unit sends the third signal to the south bridge controller, such that the south bridge controller sends an instruction of turning off the power supply of the LAN controller, such as a power switching signal (Step S230).

If the voltage level of the second signal is a high voltage level or the voltage level of the first signal is a low voltage level, the main control unit sends the third signal to the south bridge controller, such that the south bridge controller send an instruction of turning on the power supply of the LAN controller (Step S260). Then, the south bridge controller begins the monitoring operation flow from Step S210 until the personal computer is powered off.

Figure 3A:
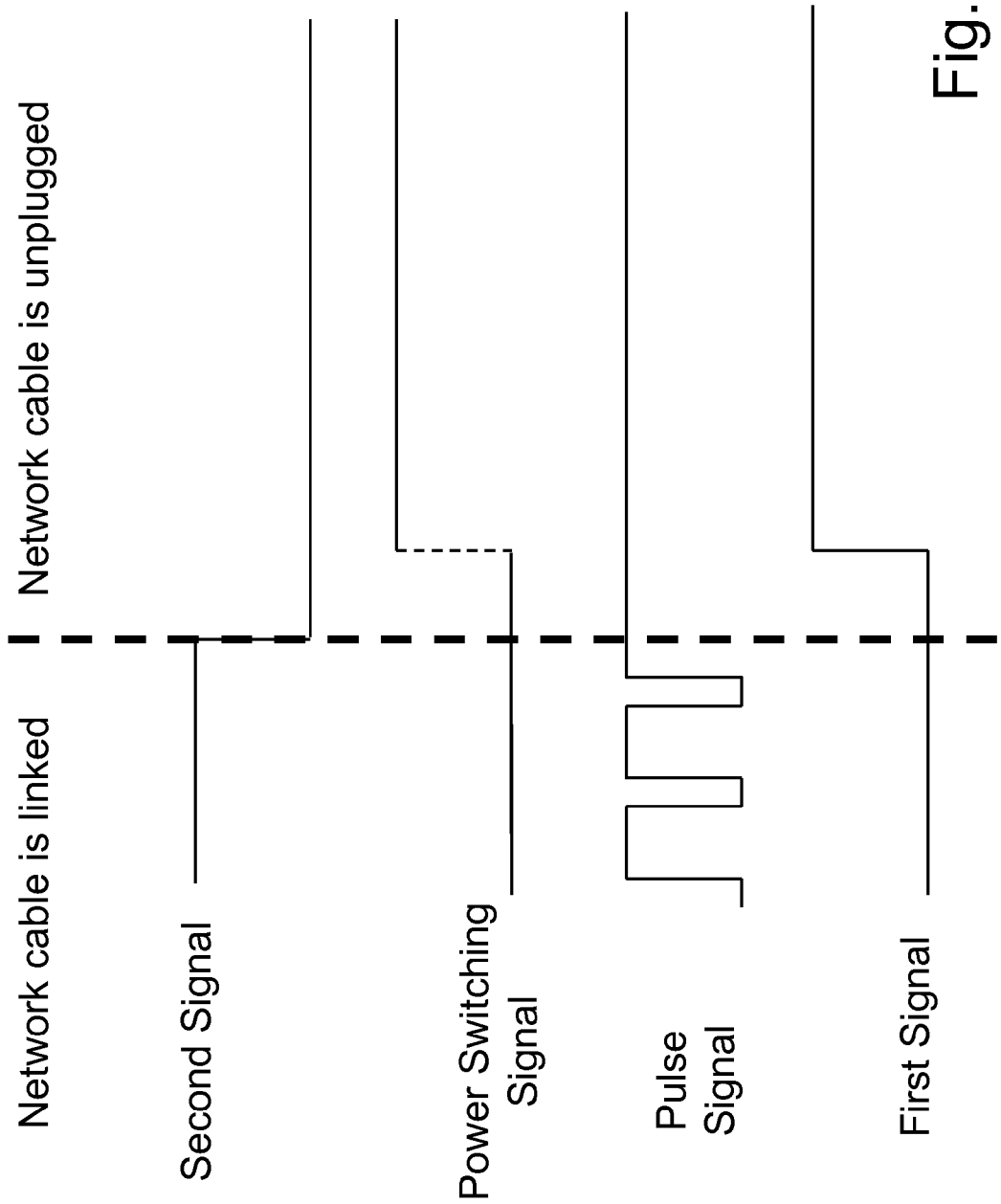
FIG. 3A is a timing chart when the network cable is unplugged.

Referring to FIG. 3A, it is a timing chart when the network cable is unplugged. The left part in FIG. 3A represents that the network cable 160 is linked to the detection system 100, and the right part represents that the network cable 160 is unplugged from the detection system 100. The time axis is shown from left to right, and the timing from top to bottom is sequentially the second signal, the power switching signal, the network plugging and unplugging signal, and the first signal. When the network cable 160 is unplugged from the network interface 110, the main control unit 140 detects that the second signal changes from the high voltage level to the low voltage level. Then, the main control unit 140 informs the south bridge controller 150 to output the power switching signal at the high voltage level, so as to turn off the power source of the LAN controller 130. Meanwhile, the pulse signal in the network state detection unit 130 stops the changing of the voltage level, such that the voltage level of the first signal maintain the high voltage level state. The main control unit 140 begins to monitor the variation of the voltage level of the first signal.

Figure 3B:
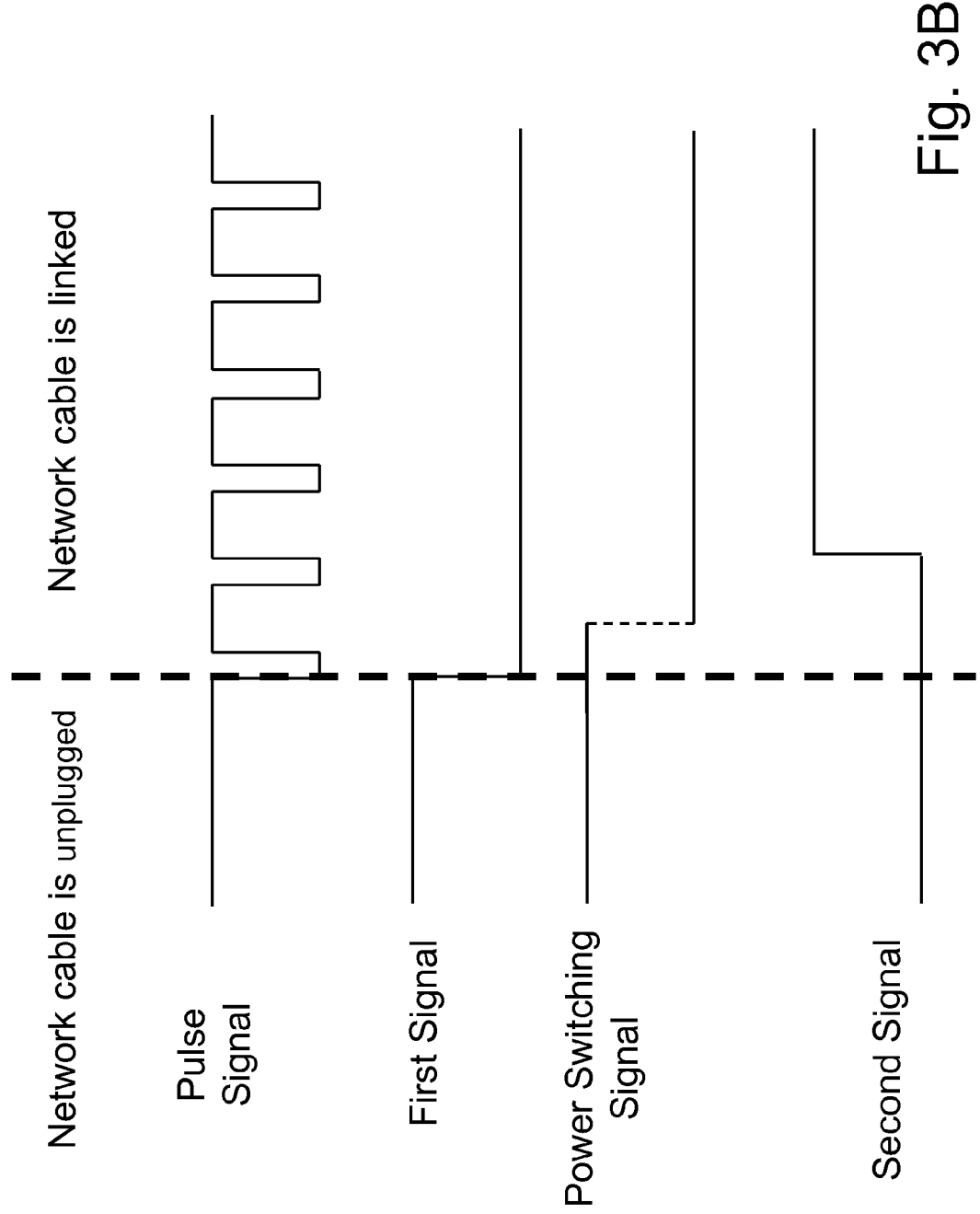
FIG. 3B is a timing chart when the network cable is linked.

Referring to FIG. 3B, it is a timing chart when the network cable is linked. The left part in FIG. 3B represents that the network cable 160 is unplugged from the detection system 100, and the right part represents that the network cable 160 is linked to the detection system 100. The time axis is shown from left to right, and the timing from top to bottom is sequentially the network plugging and unplugging signal, the first signal, the power switching signal, and the second signal. When the network cable 160 is plugged into the network interface 110, the pulse signal in the network state detection unit 130 begins to oscillate, such that the first signal is changed to the low voltage level. Then, the main control unit 140 informs the south bridge controller 150 to turn on the power supply of the LAN controller 130. Therefore, the second signal is changed from the low voltage level to the high voltage level, the main control unit 140 is changed to monitor whether the voltage level of the second signal is changed to the low voltage level or not.

In the present invention, the network state detection unit 120 and the main control unit 140 are adopted together to detect the plugging and unplugging state of the network cable 160, and to further determine whether the network cable 160 is linked in an idle contact state. Another objective of the present invention is to further detect whether the network connecting is an idle contact state or not. According to the above situation, the personal computer determines whether to turn off the power supply of the LAN controller 130 or not, and accordingly, other peripherals of the personal computer enter the power-saving mode.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power control method, comprising the steps of:
generating a first signal by a network state detection unit, wherein the first signal changes from a first value to a second value when a network cable is linked to a network interface and electrical signals are received from the network cable via the network interface;
generating a second signal by a LAN controller, wherein the second signal changes from a first value to a second value when the network cable is unplugged from the network interface;
generating a power switching signal by a control unit to control an ON and OFF status of a power supply of the LAN controller, the power switching signal being generated according to the first and second signals, wherein the power supply is switched ON when the first signal changes from the first value to the second value thereof, and the power supply is switched OFF when the second signal changes from the first value to the second value thereof, wherein the LAN controller is turned OFF when the network cable is unplugged from the network interface, and turned ON when the network cable is both plugged back in and electrical signals are received from the network cable via the network interface, wherein the first signal is generated by the network state detection unit according to a pulse signal also generated by the network state detection unit, the pulse signal having an oscillating value when electrical signals are received from the network cable via the network interface, and a constant value when electrical signals are not received from the network cable via the network interface, the first signal changing from a first value to a second value when the pulse signal changes from a constant value to an oscillating value, and wherein the pulse signal is generated both when the network cable is plugged into the network interface and when it is unplugged from the network interface.

2. The power control method of claim 1, wherein when a network cable is linked to the network interface but no electrical signals are received from the network cable via the network interface, the first signal will remain the first value thereof if already the first value, and will change to the first value thereof if not already the first value.

3. The power control method of claim 2, wherein when a network cable is linked to the network interface but no electrical signals are received from the network cable via the network interface, the power supply will remain switched OFF if already switched OFF, and become switched OFF if not already switched OFF.

4. The power control method of claim 1, wherein the network interface is RJ-45.

5. The power control method of claim 1, wherein after the power supply of the LAN controller is switched ON by the control unit, the control unit begins to monitor the second signal for a change in value.

6. The power control method of claim 1, wherein the network state detection unit continues to detect for electrical signals when the power supply of the LAN controller is switched off.

* * * * *